United States Patent [19]

Portnoy

[11] 4,044,090

[45] Aug. 23, 1977

[54] PROCESS FOR PRODUCING REGENERATED CELLULOSIC PRODUCT

[75] Inventor: Norman A. Portnoy, Hopatcong, N.J.

[73] Assignee: International Telephone and Telegraph Corporation, New York, N.Y.

[21] Appl. No.: 594,325

[22] Filed: July 9, 1975

[51] Int. Cl.$^2$ .................... C08B 5/00; C08B 16/00; D01F 2/28

[52] U.S. Cl. .................................. 264/187; 106/168; 264/210 F; 536/30

[58] Field of Search ............... 260/212; 106/168, 165; 536/30; 264/187, 210 F

[56] References Cited

U.S. PATENT DOCUMENTS

| | | | |
|---|---|---|---|
| 3,236,669 | 2/1966 | Williams | 260/212 |
| 3,702,843 | 11/1972 | Schweiger | 260/209.6 |

OTHER PUBLICATIONS

Ott et al., Cellulose & Cellulose Derivatives, (2nd ed.) (Part II), (Interscience) (N.Y.), (1954), pp. 1013–1016.

*Primary Examiner*—Donald E. Czaja
*Assistant Examiner*—H. H. Fletcher
*Attorney, Agent, or Firm*—J. B. Raden; H. J. Holt

[57] ABSTRACT

A regenerated cellulosic product is produced by nitrosating and dissolving a cellulosic material in a solution comprising a dialkylacylamide solvent and adding from 2 to 25% by weight, based on the weight of the solution, of a tertiary amine to form a soluble cellulose nitrite ester, contacting the cellulose ester with a coagulant therefore, stretching the coagulated cellulose ester prior to complete regeneration thereof and then completing the regeneration of the cellulose to produce a regenerated cellulosic product.

9 Claims, No Drawings

PROCESS FOR PRODUCING REGENERATED CELLULOSIC PRODUCT

This invention relates to a process for producing a regenerated cellulosic product and more specifically to a process for producing cellulosic products by a controlled regeneration of the cellulose from an organic solvent.

The use of organic solvent systems for dissolving cellulose and producing regenerated cellulosic products has received an increasing amount of attention because of the cost and environmental problems associated with conventional viscose processes. One such organic solvent system having considerable promise consists of a dimethylformamide solvent and dinitrogen tetroxide as a nitriting or nitrosating agent. In such a system, the cellulose is regenerated from the organic solvent by contact with a non-solvent for the cellulose such as water or a lower alcohol. The process has however been found to produce fibers of low conditioned elongations resulting in a poor tensile/elongation balance.

U.S. Pat. No. 3,702,843 to Schweiger discloses a process for producing cellulose nitrate esters by nitrosating cellulose in a suitable solvent such as dimethylformamide to form the nitrite ester intermediate and then heating to form the nitrate. The nitrite ester intermediate may be isolated according to the patent by neutralizing the reaction mixture with a base such as an amine and adding the neutralized solution to cold water. However, the patent is directed to a process for forming certain chemical compounds or their intermediates. It is not concerned with nor does it disclose a process of regenerating cellulosic products.

It is a primary object of the present invention to provide a process for producing high quality cellulosic products regenerated from an organic solvent system.

It is a more specific object of the present invention to provide a process for producing regenerated cellulosic fibers from an organic solvent system, which fibers possess high conditioned elongation and work to rupture properties.

The foregoing and other objects of the invention are achieved by a process comprising nitrosating and dissolving a cellulosic material in a solution of a dialkylacylamide solvent and adding from 2 to 25% by weight of the solution of a tertiary amine to form a soluble cellulose nitrite ester, contacting the cellulose ester with a coagulant therefore, stretching the coagulated ester prior to complete regeneration thereof, and finally completing the regeneration of the cellulose.

The invention is based upon the finding that regenerated cellulosic products of improved properties result from a slower and hence more controlled regeneration of the cellulose nitrite ester formed in the solvent. This permits stretching and orientation of the cellulosic ester after coagulation but before complete regeneration. With slower regeneration, a more plastic filament or other shape results which can undergo further stretching and orientation during regeneration.

Fibers produced in accordance with the process of the invention have tensile properties at least equivalent to those of prior art solvent spun fibers but have improved conditioned elongation. Higher conditioned elongation gives rise to an overall higher work to rupture (conditioned tenacity x conditioned elongation) and hence a tougher fiber. The result is a product of more balanced properties.

In the practice of the present invention, the cellulosic material is first nitrosated and dissolved in the dialkylacylamide solvent. This may be done by adding the cellulosic material to the dialkylacylamide and then feeding nitrogen dioxide, or its dimer, dinitrogen tetroxide into the mixture while stirring. To the solution is then added the amine in an amount of 2 to 25% by weight of the solution. Analytical studies have indicated that this process of solution involves a reaction of the nitrosating agent with cellulose to form a solvent soluble cellulose nitrite ester (CEll-ONO) and nitric acid. The solution is then brought into contact with a coagulant, or a coagulant-regenerant, to coagulate the cellulose nitrite ester. The cellulose ester is then stretched and regeneration is completed by contacting the ester with a regenerant. Completion of regeneration — removal of —NO groups — may be performed during further stretching in a regenerating bath or subsequent to stretching in the primary or a subsequent bath. In the case of a fiber, the solution will normally be spun into a primary coagulant-regenerant bath, the coagulated fiber passed to a primary godet, then through a secondary bath to a secondary godet whose speed can be altered to produce the desired degree of stretch. Additional godets and/or coagulant-regeneration baths may be used to introduce further stretch and complete the regeneration. Films may be produced in similar fashion by extrusion into the coagulant followed by stretching and orientation as, for example, in conventional cellophane flat sheet extrusion equipment. In addition, tubular films may be produced using circular die techniques well-known in the blown film and sausage industries. Stretching may occur while immersed in the coagulant or in air after withdrawal from the coagulant bath.

A wide variety of coagulant baths may be used for coagulation and ultimate regeneration of the cellulose. Where more than a single coagulant bath is used, the baths may consist of the same or different coagulants. A particularly useful class of coagulants, which also act as regenerants, are 1-9 carbon aliphatic alcohols, and particularly 1-3 carbon aliphatic alcohols including methanol, ethanol and isopropanol. Other useful alcohols are aromatic alcohols such as benzyl alcohol and cycloaliphatic alcohols such as cyclohexanol. Water, aqueous solutions of the foregoing alcohols and aqueous and alcoholic solutions of the dialkylacylamides are also useful. The aforementioned materials act as both coagulants and regenerants. For purposes of coagulation, any liquid may be used which is compatible with, and causes extraction of the solvent from the cellulose. The regenerant must contain a chemical moiety such as a hydroxylic or protonic group which is capable of removing an —NO group from the cellulose. In most instances a single material will function for both purposes.

Optimum coagulation-regenerant systems have been found to be aqueous or alcoholic baths containing from 1-12% of an acid. The acid helps to hydrolyze the nitrite ester. A particularly suitable acid is nitric, although other acids including acetic, formic, hydrochloric, phosphoric and sulfuric acids may also be used. Amounts are generally from 1-12% by weight of the coagulant, preferably 3-8%. The addition of an acidic salt, such as $Ca(NO_3)_2 \cdot 4H_2O$ is also useful to cause increased densification of the filament and syneresis of the liquid from the fiber.

The solvent is preferably N, N-dimethylformamide (DMF). However, other dialkylacylamides may be used such as N, N-dimethyl — and N, N-diethylacetamide. A wide variety of cellulosic sources may be used such as chemical pulps, either sulfite or kraft, bleached or unbleached, oxidized or unoxidized. Cotton linters, reprocessed cellulose and purified bast fibers are other typical sources of cellulose. About 2-14 grams of cellulose per 100cc of solvent should typically be used, preferably from 5-8 grams per 100cc's of solvent. Solution takes place at room temperature. The concentrations will vary with the degree of polymerization (DP) of the cellulose, lower concentrations being used for higher DP's. The cellulosic pulps will normally vary from 250-1000 DP, a range of 300-800 being preferred.

The nitrosating agent is fed into the mixture of solvent and cellulose, normally in stoichiometric excess. The nitrosyl group is preferably added as $NO_2$ or its dimer $N_2O_4$ but may also be other oxides such as $N_2O_3$ or $N_2O_5$ or other nitrosating species such as nitrosyl chloride. Slightly greater than 3 moles of the nitrosating agent should be added per mole of anhydroglucose unit in the cellulose.

The tertiary amine is added after nitriting and dissolving the cellulose. A large variety of tertiary amines, in addition to pyridine, may be used including tertiary alkyl amines such as trimethyl, triethyl and tripropyl amine. Other useful tertiary amines are N-methyl morpholine, N-alkyl pyrroles, N-alkyl pyrrolidines and N-alkyl pyrrolines. The tertiary amines should be used in an amount of from about 2-25% by weight of the cellulosic solution, preferably about 6-14% by weight.

The following examples are illustrative of the practice of the invention. All parts are by weight unless otherwise indicated.

EXAMPLE 1

A cellulose solution was prepared from 160 parts of aged prehydrolyzed kraft pulp (D.P. 485), 300 parts liquid $N_2O_4$ and 1540 parts DMF keeping the temperature 10°-30° C, preferably 20°-25° C. To this was added 450 parts (18.4%) of pyridine keeping a solution temperature of 20°-40° C, preferably 20°-30°C, to make a clear, honey colored solution. This was deaerated and vertically spun using a glass 300 hole (0.0025 inch) spinnerette. The fiber tow was passed through a primary bath at 22° C of 900 parts by volume DMF, 60 parts by volume water, 120 parts by volume 70% $HNO_3$ and 200 parts by weight $Ca(NO_3)_2 \cdot 4H_2O$. The secondary bath was water at 22° C. The tertiary bath was 5% aqueous $HNO_3$ at 22° C.

Following the final bath, the fibers were treated with water and 5% sodium bicarbonate, both at room temperature for 10-20 minutes and then finished with 0.3% of a lubricating finish prior to air drying. Godet stretch was 57%. (As used in this and the following examples, godet stretch is the difference between the circumferential speed of the initial and final godet, divided by the speed of the initial godet, times 100.) The fiber properties are shown in Table I.

EXAMPLE 2

Example 1 was repeated using a primary bath of $DMF/H_2O/70\%$ $HNO_3/Ca(NO_3)_2 \cdot 4H_2O$ at 58° C having a volume/volume/volume/weight ratio of 2700/440/280/600. The secondary bath was as in Example 1. A tertiary bath was omitted. Godet stretch was 80%. The fiber properties are shown in Table I.

TABLE I

| EXAMPLE | DENIER | TENACITY (g/d) | | ELONGATION % | | WET TENACITY AT 5% ELONGATION (g/d) | TOUGHNESS (g/d)* |
| --- | --- | --- | --- | --- | --- | --- | --- |
| | | COND. | WET | COND. | WET | | |
| 1 | 1.43 | 2.22 | 0.82 | 10.97 | 27.47 | 0.23 | 24.35 |
| 2 | 1.75 | 2.40 | 1.10 | 9.89 | 18.41 | 0.49 | 23.74 |

*Conditioned tenacity × conditioned elongation (work to rupture).

EXAMPLE 3

The same procedure as in Example 1 was followed except that 290 parts (12.6%) pyridine was added to the cellulose solution. The primary bath was 850 ml methanol containing 25 ml of 70% aqueous $HNO_3$ at 22° C. The secondary bath was water at 22° C and the tertiary bath was an aqueous 5% $HNO_3$ solution at 22° C. Godet stretch was 64%. Fiber properties are shown in Table II.

EXAMPLE 4

The procedure in example 3 was followed except that the secondary bath contained 5% $HNO_3$. A tertiary bath of water at 22° C was used. Godet stretch was 114%. These rayon fibers exhibited the properties in Table II.

EXAMPLE 5

Example 3 was followed except that the primary bath contained 850 ml of methanol and 50 ml of 70% aqueous $HNO_3$ at 22° C. Both the secondary and tertiary baths were water at 22° C. Godet stretch was 68%. Fiber properties are shown in Table II.

TABLE II

| EXAMPLE | DENIER | TENACITY (g/d) | | ELONGATION % | | WET TENACITY AT 5% ELONGATION (g/d) | TOUGHNESS (g/d) |
| --- | --- | --- | --- | --- | --- | --- | --- |
| | | COND. | WET | COND. | WET | | |
| 3 | 1.39 | 2.31 | 1.25 | 11.01 | 27.66 | 0.44 | 25.43 |
| 4 | 1.77 | 2.85 | 1.38 | 9.91 | 23.54 | 0.51 | 28.24 |
| 5 | 1.15 | 3.23 | 1.87 | 9.04 | 14.43 | 0.80 | 29.20 |

EXAMPLE 6

The procedure of Example 1 was again followed except that 145 parts (6.8%) of pyridine were added to the cellulose solution. The primary bath was methanol at 22° C, the secondary and tertiary baths were water at 22° C. Godet stretch was 70%. Fiber properties are shown in Table III.

EXAMPLE 7

Example 6 was repeated at a godet stretch of 83%. Fiber properties are shown in Table III.

TABLE III

| EXAMPLE | DENIER | TENACITY (g/d) COND. | WET | ELONGATION % COND. | WET | WET TENACITY AT 5% ELONGATION (g/d) | TOUGHNESS (g/d) |
|---|---|---|---|---|---|---|---|
| 6 | 1.35 | 2.69 | 1.49 | 9.79 | 20.29 | 0.68 | 26.34 |
| 7 | 1.10 | 2.63 | 1.53 | 9.46 | 21.82 | 0.61 | 24.88 |

EXAMPLE 8

Fibers were prepared using the same procedure as Example 7 but omitting pyridine from the cellulose solution. Godet stretch was 80%. Fiber properties are shown in Table IV.

EXAMPLE 9

The same procedure was used as in Example 3 except that pyridine was added to the primary bath rather than the cellulose solution. The primary bath was composed of 30 parts of pyridine and 850 parts of methanol. Secondary bath was water at 22° C, tertiary bath was 3% aqueous solution of $HNO_3$ at 22° C. Godet stretch was 83%. Fiber properties are shown in Table IV.

TABLE IV

| EXAMPLE | DENIER | TENACITY (g/d) COND. | WET | ELONGATION % COND. | WET | WEST TENACITY AT 5% ELONGATION (g/d) | TOUGHNESS (g/d) |
|---|---|---|---|---|---|---|---|
| 8 | 0.94 | 3.05 | 1.75 | 5.42 | 11.54 | 1.16 | 16.53 |
| 9 | 1.15 | 3.23 | 1.75 | 5.88 | 12.63 | 0.80 | 18.99 |

Tables III and IV illustrate both that the addition of pyridine to the cellulose solution improves elongation and toughness over comparably solutions without pyridine and that the use of pyidine in the spin bath (rather than in the cellulose solution) does not produce an equivalent improvement.

I claim:

1. A process for producing a regenerated cellulosic product comprising
    nitrosating and dissolving a cellulosic material in a solution comprising a dialkylacylamide solvent and adding from 2-25% by weight of the solution of a tertiary amine to form a soluble cellulose nitrite ester, forming the cellulose ester into a filament or other shape,
    contacting the cellulose ester with a coagulant therefore,
    stretching the coagulated cellulose ester prior to complete regeneration thereof, and
    completing the regeneration of the cellulose, 2. The process of claim 1 in which the tertiary amine is pyridine.

3. The process of claim 1 in which the dialkylacylamide is dimethylformamide.

4. The process of claim 1 in which the solution contains from 6-14% by weight of the amine.

5. The process of claim 1 in which the coagulant comprises a 1-3 carbon aliphatic monohydroc alcohol.

6. The process of claim 1 in which the coagulant contains from 1-12% by weight of an acid.

7. The process of claim 1 in which the tertiary amine is added after dissolution of the cellulosic material.

8. The process of claim 1 in which the regenerated cellulosic product is a fiber.

9. The process of claim 1 in which the nitrosating agent is dinitrogen tetroxide.

* * * * *